United States Patent [19]
Michel

[11] Patent Number: 5,359,323
[45] Date of Patent: Oct. 25, 1994

[54] DEVICE FOR REMOTE DIALOG BETWEEN A STATION AND ONE OR MORE PORTABLE OBJECTS

[75] Inventor: Philippe Michel, Herouville Saint-Clair, France

[73] Assignee: France Telecom (Centre National d-Etudes des Telecommunications), Paris, France

[21] Appl. No.: 747,870

[22] Filed: Aug. 20, 1991

[30] Foreign Application Priority Data

Aug. 24, 1990 [FR] France ............... 90 10651

[51] Int. Cl.⁵ ............................................. H04Q 9/00
[52] U.S. Cl. ........................ 340/825.54; 340/825.08
[58] Field of Search ............. 340/825.54, 825.34, 340/825.07, 825.08, 825.5, 505, 572; 370/85.8, 95.2, 85.3

[56] References Cited

U.S. PATENT DOCUMENTS

| | | | |
|---|---|---|---|
| 4,466,001 | 8/1984 | Moore et al. | 370/95.2 |
| 4,471,345 | 9/1984 | Barrett, Jr. | 340/572 |
| 4,495,496 | 1/1985 | Miller, III | 340/825.54 |
| 4,595,921 | 6/1986 | Wang et al. | 370/95.2 |
| 4,636,950 | 1/1987 | Caswell et al. | 340/825.54 |
| 4,673,932 | 6/1987 | Ekchian et al. | 340/825.54 |
| 4,691,202 | 9/1987 | Denne et al. | 340/825.54 |
| 4,931,788 | 6/1990 | Creswick | 340/825.54 |
| 5,124,699 | 6/1992 | Tervoert et al. | 340/825.54 |

FOREIGN PATENT DOCUMENTS

| | | |
|---|---|---|
| 0161779 | 11/1985 | European Pat. Off. . |
| 0270274 | 6/1988 | European Pat. Off. . |
| 0285419 | 10/1988 | European Pat. Off. . |
| 0374018 | 12/1989 | European Pat. Off. . |
| 2623311 | 3/1989 | France . |
| 2640830 | 6/1990 | France . |

OTHER PUBLICATIONS

European Search Report and Annex thereto.

Primary Examiner—Donald J. Yusko
Assistant Examiner—Edwin C. Holloway, III
Attorney, Agent, or Firm—Staas & Halsey

[57] ABSTRACT

Inside a range of action defined by a station, the station is able to generate therein an enquiry message followed by a silence zone. The station then selectively analyzes the respective contents of a plurality of disjoint time intervals from this silence zone. In the event of obtaining in one of these time intervals, chosen randomly by a single portable object, a content identified as a specified response message associated with this portable object, the station generates a selection message intended for this portable object, which, on reception of this selection message, generates in its turn an acknowledgement message. There follows provision for a phase of transactional communication between the selected portable object and the station.

33 Claims, 10 Drawing Sheets

DEVICE FOR REMOTE DIALOG BETWEEN A STATION AND ONE OR MORE PORTABLE OBJECTS

BACKGROUND OF THE INVENTION

1. Field of the Invention

The invention relates to the remote exchange of information between a station and one or more portable objects.

It applies particularly but not exclusively to the exchange of information between an electronic memory card, for example a "chip card", and a terminal.

2. Description of the Related Art

The concept of "remote" exchange is contrasted here with that of an exchange requiring a contact interface, of electrical or some other kind, between the card and the terminal, as is for example the case in telecard payphones.

This type of interface can be regarded as fairly constraining in a certain number of applications such as identification of people or control of access by people to a building. It can be equally constraining in the case of banking transactions requiring the card to be passed into a slot of the terminal.

A device for remote exchange of data between a portable object and a station has been described in European Patent Application No. 89 403398.3 of Dec. 7, 1989.

In this prior device, there is provided, in the station, a station-dialogue unit able to define a range of action, and, in the portable object, an object-dialogue unit possessing an active state in which it is able to mutually interact remotely with the station-dialogue unit inside the range of action, in order to effect the exchange of information.

Although this prior device teaches a way of producing in hardware such a data exchange between the station and a single portable object, it is expedient to solve the problems which arise when several carriers equipped respectively with several chip cards, for example, simultaneously are present in the range of action of the station.

No device is currently known permitting simple and efficient solution of the potential conflicts which can result from this multiple presence of portable objects before the station.

The invention aims to solve this problem.

SUMMARY OF THE INVENTION

One object of the invention consists in taking account of the possible fluctuations in the limits of the range of action defined by the station so that these limits do not disturb the dialogue between the latter and the portable object(s).

Another object of the invention is to minimize the energy consumption of the portable object when the latter lies outside the range of action.

The proposed device is of the type of that mentioned above.

According to a general characteristic of the invention, the station-dialogue unit comprises:
- station-processing means possessing:
  * a primary condition in which they are able to
    a) generate an enquiry message in the said range of action, followed by a silence zone,
    b) selectively analyze the respective contents of a plurality of disjoint time intervals from the said silence zone, and
    c) in the event of obtaining in one of these time intervals a content identified as a specified response message associated with a single portable object, generate a selection message intended for the portable object, and, in the contrary event, repeat, at the end of the silence zone, the operations a) and b), and
  * a condition of dialogue with the portable object selected, and
- station-command means able to select the various conditions of the station-processing means as a function of specified station-command criteria, and moreover the or each object-dialogue unit comprises object-processing means possessing, in the active state,
  * an initialization condition in which they are able, on reception of the enquiry message, to
    e) randomly choose one of the time intervals,
    f) generate the specified response message associated with this object inside the chosen time interval, and
    g) generate an acknowledgement message in the event of reception of the selection message, and
  * a condition of transactional communication with the station-dialogue unit;

there is also provision for the object-dialogue unit to comprise object-command means able to change the object-processing means from the initialization condition to the transactional communication condition in the event of absence of reception of another enquiry message after transmission of the acknowledgement message.

The subject of the invention is also a portable object, comprising an object-dialogue unit possessing a passive state, and an active state in which it is able to remotely interact with a station inside a range of action defined by the station, in order to effect an exchange of information with the station, characterized in that the object-dialogue unit comprises:
- object-processing means possessing, in the said active state
  * an initialization condition in which, on reception of an enquiry message transmitted by the station and followed by a silence zone, they are able
    to generate a specified response message intended for the station within a time interval chosen from a plurality of disjoint time intervals from the silence zone, and
    to generate an acknowledgement message in the event of reception, subsequent to the generation of the response message, of a selection message transmitted by the station, and
  * a condition of transactional communication with the station-dialogue unit, and
- object-command means able to change the object-processing means from their initialization condition to the transactional communication condition in the event of absence of reception of another enquiry message after transmission of the acknowledgement message.

Finally, the subject of the invention is a station belonging to the information exchange device having the characteristics mentioned above.

Other advantages and characteristics of the invention will emerge on examining the detailed description below and the attached drawings.

BRIEF DESCRIPTION OF THE DRAWINGS

The drawings comprise for the most part elements of certain character. To this end, they form an integral part of the description and will not only serve to make the following description better understood but also contribute, if appropriate, to the definition of the invention.

DESCRIPTION OF THE PREFERRED EMBODIMENTS

Figure 1:
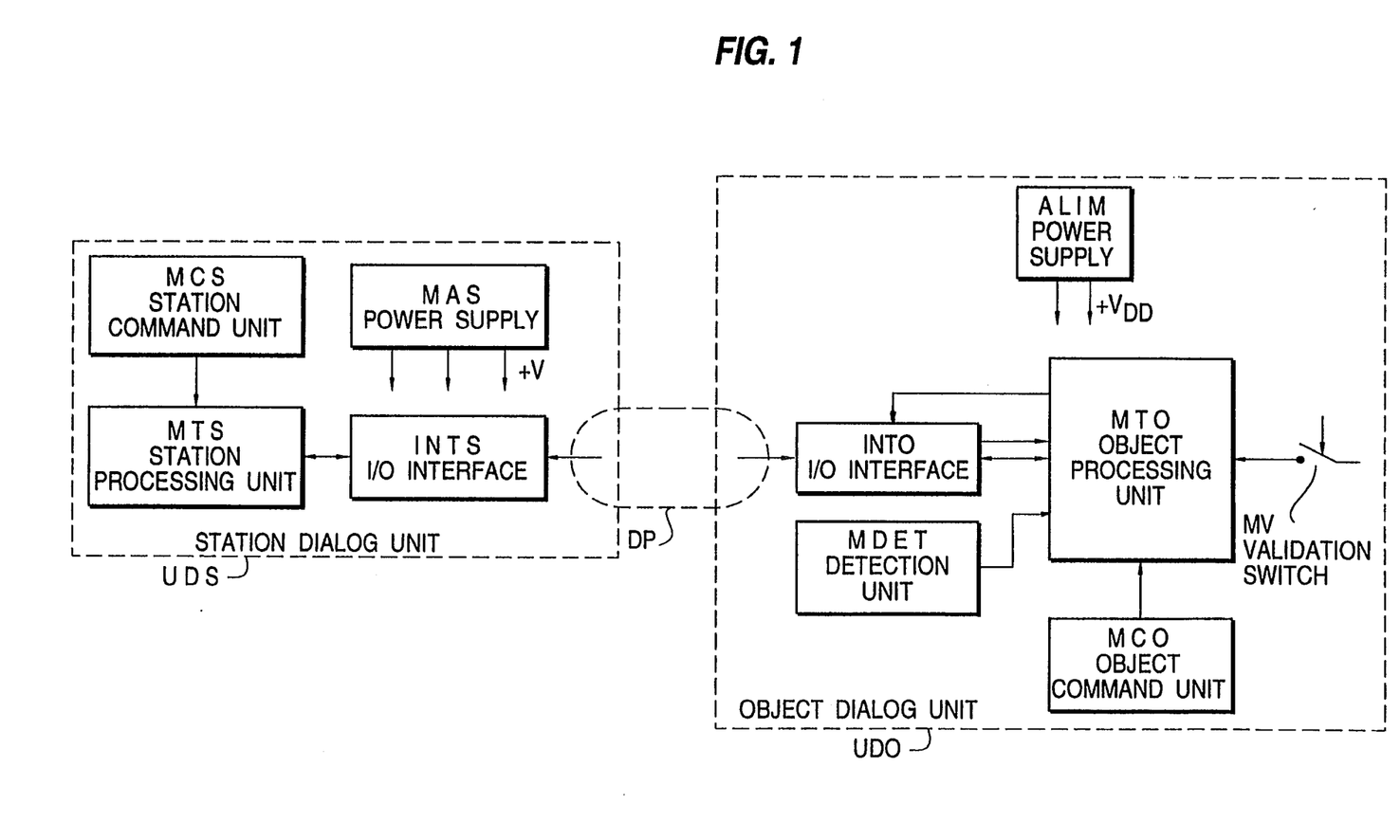
FIG. 1, 2A and 2B are diagrammatic overviews of an embodiment of the device according to the invention.

In FIG. 1, the reference UDS designates a dialog unit installed in the station, for example a terminal. This station-dialog unit comprises station-processing means MTS commanded by station-command means MCS (both these functions being able to be carried out by one processor) and interacting with transmission/reception interface means INTS. The dialog unit UDS is supplied by supply means MAS.

The exchange of information occurs inside a range of action DP defined by the station-dialog unit UDS.

Similarly, the portable object, for example a memory card, is provided with an object-dialog unit UDO comprising object-processing means MTO, commanded by object-command means MCO and connected to transmission/reception interface means INTO. There are also provided supply means ALIM, such as a battery, means of detecting the limits of the range of action, as well as validation means MV able, as will be seen later, to be actuated by the carrier of the card, in certain applications, to authorize or otherwise permit the exchange of information between the station and the portable object.

As regards the respective hardware structures of the object and station-dialog units, it will for example be possible to use those described in European Patent Application No. 89 403398.3. Nevertheless, the invention is not limited to such an embodiment.

Figure 2A:
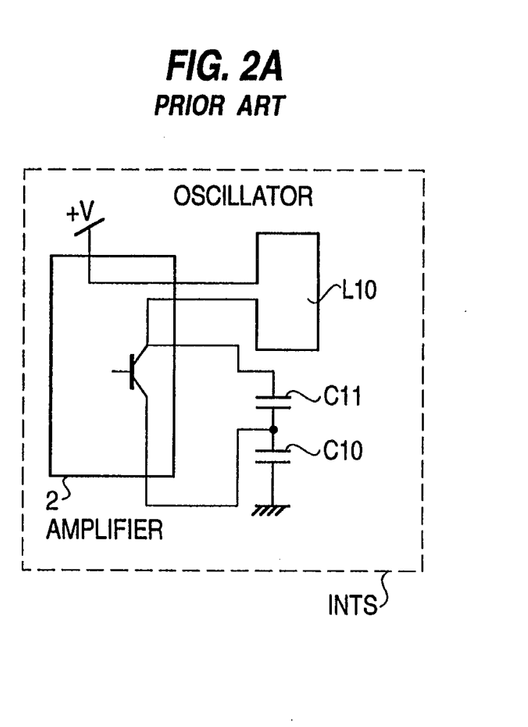
Figure 2B:
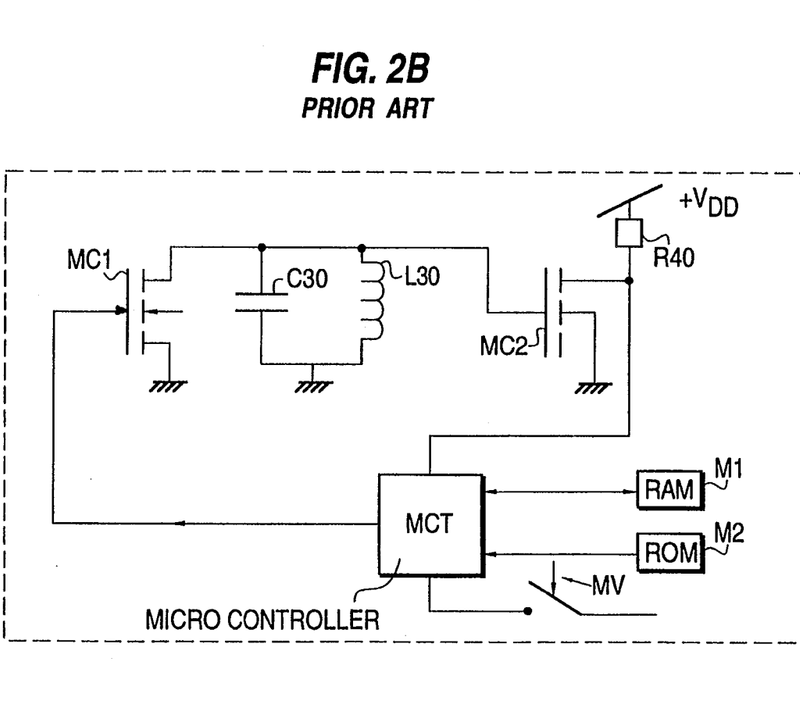

It is briefly described here, referring to FIGS. 2A and 2B taken from FIGS. 1 to 4 of the abovementioned European Patent Application, that there is provided, in this case, in the station, an oscillator comprising amplifier means 2 associated with a feedback loop (L10, C11, C10) possessing a station-inductive element (L10), and able to confer upon it a variable working frequency relative to a passive frequency, whereas in the portable object there is provided an electronic circuit (C30, L30) which can be switched between an inactive state and an active state in which it forms a resonant circuit tuned to a distinct frequency of the passive frequency, while remaining able to inductively couple with the feedback loop at the passive frequency. The station-processing means MTS, connected to the oscillator, are capable of processing the variations in the working frequency, whereas the electronic circuit is switched as a function of information to be transmitted to the station, the variation in the working frequency of the oscillator, thus induced by its switchings, enabling the station-processing means to deduce therefrom the information.

In other words, the working frequency of the oscillator changes from its passive value to a different value and vice versa depending on the binary datum transmitted from the portable object to the station. The station-processing means, after having analyzed these variations, deduce therefrom the information transmitted.

The station-inductive element L10 is for example a gantry which it will be possible for the carrier of the card to pass into.

As regards the dialog unit UDO of the card, such as is illustrated in FIG. 2B, there is provided a microcontroller MCT associated with a random-access work memory M1 and a permanent, read-only memory M2. Functionally, the microcontroller and its memories form part of the object-processing means as well as the object-command means. Switches MC1 and MC2, such as field-effect transistors, complete the object-command means. The electronic circuit comprises an inductor L30 connected in parallel with a capacitor C30. The resonant circuit thus formed is capable of being tuned or not to the working frequency of the oscillator via the switch MC1 operated by the microcontroller MCT. It is recalled here that. Depending on the value of the binary datum to be transmitted from the card to the terminal, the switch MC1 will be open or closed.

Similarly, an input of the object-processing means, for example the interrupt lug of the microcontroller, is capable of being connected either to earth, or to a specified voltage +VDD via a resistor R40, this voltage being delivered by the supply means ALIM. The choice of this connection depends on the field-effect transistor MC2. Its grid is connected to the interrupt lug of the microcontroller whereas the drain is connected to the pin of the capacitive element opposite that connected to earth, the source being connected to earth and the substrate being aloft.

The transmission of information in the terminal-to-card direction is performed simply by the application or non-application of a voltage to the pins of the inductive element L30. For this purpose, it is recalled that it is necessary for the electronic circuit L30, C30 to form a resonant circuit (in other words, the switch MC1 must be closed). Thus, for example in the absence of voltage across the pins of the element L30, the field-effect transistor MC2 authorizes the application of a high state on the interrupt lug of the microcontroller whereas, in the presence of a voltage across the pins of the element L30, the field-effect transistor connects this lug to earth (low state).

It is expedient to remark here that the electronic circuit C30, L30, the field-effect transistor MC2 and the interrupt lug of the microcontroller furthermore form means of detecting the limits of the range of action DP, or in other words of the magnetic field generated by the station. In fact, with the electronic circuit L30, C30 forming a resonant circuit (switch MC1 closed), a low state indicates the presence of a magnetic field whereas a high state indicates the absence of such a field.

The exchange of information is effected asynchronously by characters CAR (FIG. 3) each comprising a header bit bs generally of value 1, then a word MT having a specified number of data bits bd1–bd8 followed by a parity bit bp and an end bit bf generally of value 1. The word MT of the character is in principle one byte although the invention is not limited to such a word size.

Figure 3:
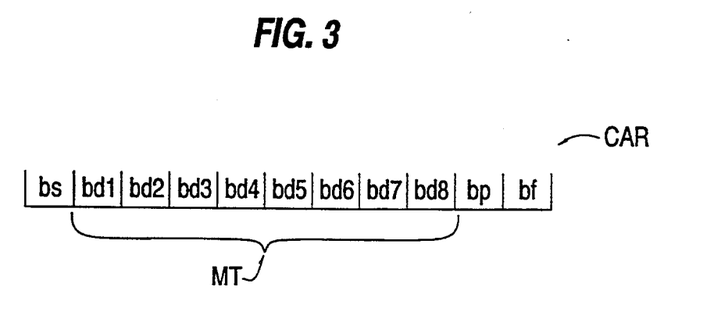
FIG. 3 illustrates the format of a character exchanged between the station and the portable object, FIGS. 4 to 6 deal with the selection of a portable object by the station, FIGS. 7 to 10 deal with the dialogue between the station and this selected portable object.

This type of transmission thus permits use of the standard central processing unit of the microcontroller forming part of the object-processing means MTO. The chosen transmission speed is here 9600 baud.

The operation properly speaking of the device will now be described in more detail.

The object-dialog unit possesses in a general way a passive state in which only the work memory M1 and the detection means are supplied, as well as an active state in which all the elements making up this dialog unit are supplied.

Upon emplacement of the battery, the card is supplied. The microcontroller is reset to zero and changes to its passive state, and the interrupt lug of the microcontroller is in the high state.

When the card enters the range of action DP of the terminal, the detection means MDET then furnish a prompt representing the presence of this card inside the range of action and the card changes to its active state.

It will be seen further on that certain precautions, the subject of which will be returned to in greater detail later, must be envisaged in order to effect this switching, in particular to ensure the effective stability of the magnetic field.

It will now be assumed that the object-dialog unit has actually changed to its active state and that the card lies inside a stable magnetic field zone.

The station-command means and the object-command means confer upon the station-processing means and the object-processing means respectively a primary condition and an initialization condition in which the station and the various portable objects will initiate a dialog whose aim is, on the one hand, to manage the possible conflicts which may appear when several portable objects simultaneously are present inside the range of action and, on the other hand, to select one of these portable objects.

Figure 4:
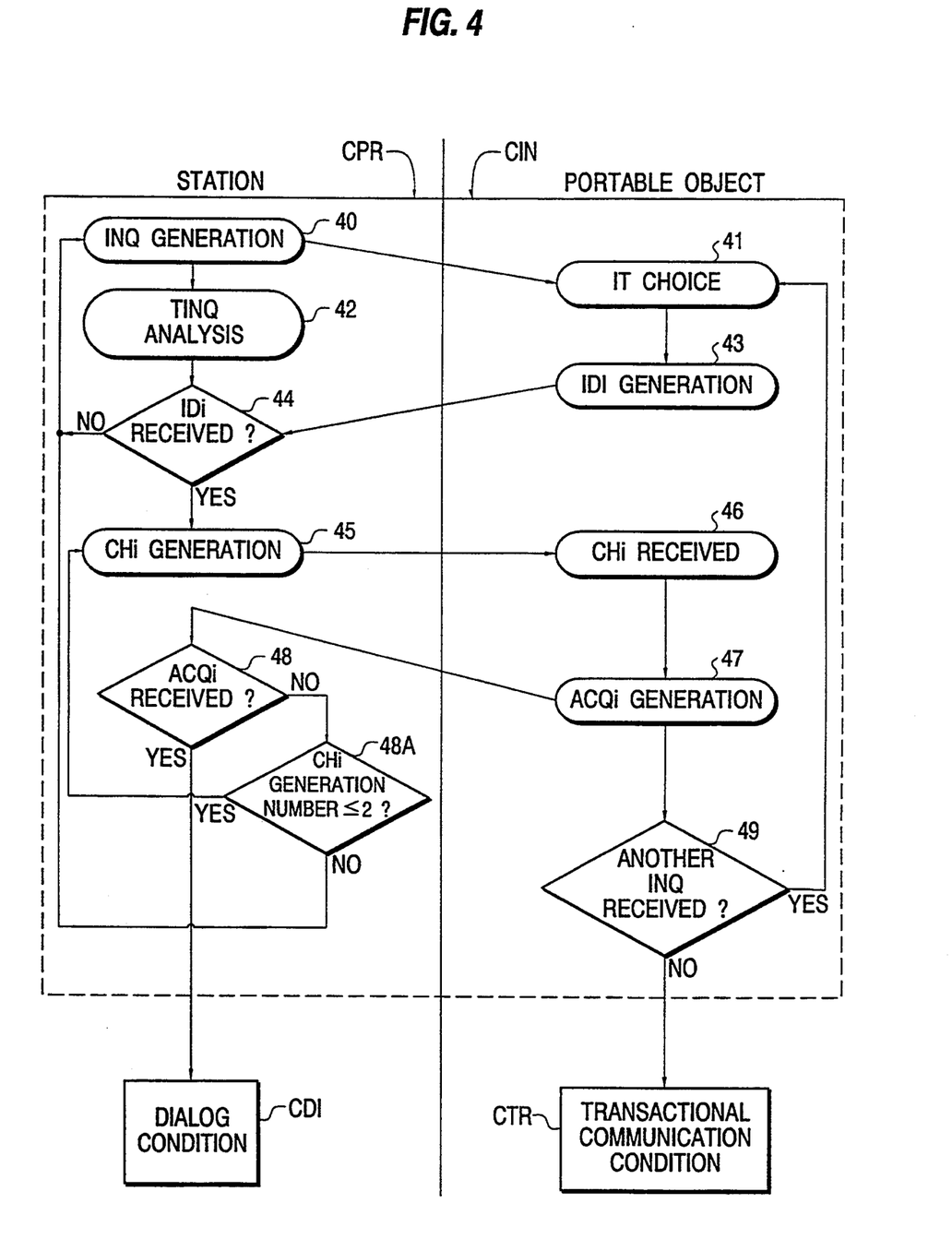
Figure 5:
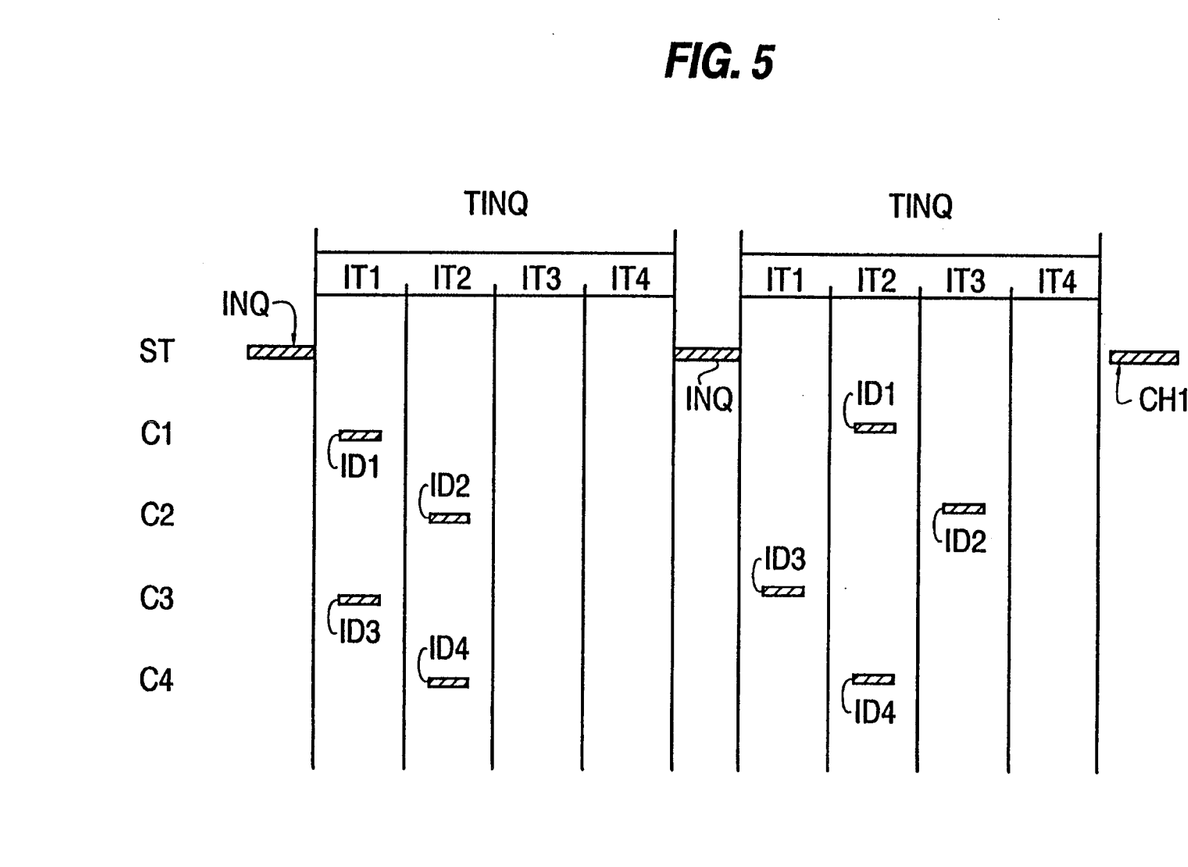

For this purpose, reference is made more particularly to FIGS. 4 and 5.

The station-processing means, in their primary condition CPR, generate an enquiry message INQ inside the range of action (step 40). This generation of the message INQ is followed by a silence zone TINQ subdivided into a plurality of disjoint time intervals. The silence zone TINQ, lasting 32 milliseconds, is here subdivided into four time intervals IT1-IT4 having an identical duration of 8 milliseconds.

The station-processing means will then selectively analyze the respective contents of these disjoint time intervals with the aim of identifying the content of one of them as being a specified response message associated with a single portable object (step 42).

On reception of this inquiry message INQ, each portable object randomly chooses one of the time intervals IT1-IT4 (step 41). By way of example, the index of the time interval is chosen by multiplying the index of the card by 127 and by adding to the result of this product the current prompt from the internal clock of the microcontroller. The number thus obtained is next brought inside the interval 1-4 with the aid of a modulo 4 operation.

After having chosen a time interval, each object-processing means generates the specified response message, which here is an identification message IDi associated in single-valued fashion with this object. This identification message can be transmitted into the zone of action within the chosen time interval since the object-processing means possess their own time reference. It is preferable for the transmission of this message to be centered in the middle of the time interval. Moreover, so as to avoid overlapping due to time-counting errors by the object-processing means, the duration of this identification message is advantageously chosen equal to half the duration of the time interval. Thus, as will be seen later, each identification message IDi is composed of four bytes whose duration of transmission is about 4 milliseconds at the chosen speed of 9600 baud.

In the event that in one of the time intervals a content is obtained which is identified as an identification message associated with a single portable object (step 44), the station-processing means then generate a selection message CHi intended for this portable object. On reception of this selection message CHi (step 46), the selected portable object generates an acknowledgement message ACQi (step 47), on reception of which (step 48) the station-command means change the station-processing means from their primary condition to a condition CDI of dialog with this portable object i.

In parallel, and since at this time, as will be seen later, the station-processing means emit no more new inquiry messages INQ (step 49), the object-command means then switch the object-processing means from the initialization condition to a condition CTR of transactional communication with the station.

Any other portable object receiving the selection message CHi associated with the portable object i remains on standby until reception of a new inquiry message INQ.

In the event that, in step 44, the station-processing means do not identify in any of the time intervals IT1-IT4 an identification message associated with a single portable object, they repeat, at the end of the silence zone TINQ, the operations for generating the inquiry message INQ and for selectively analyzing the respective contents of these time intervals. This identification inability on the part of the station-processing means may result from an absence of response in all time intervals or else from two identification message emitted by two distinct portable objects in the same time interval.

The station-analysis means then repeat steps 40 and 42 until, in one of the time intervals, a content is obtained which is identified as an identification message associated with a single portable object.

Similarly, if the station-processing means do not receive in step 48 the acknowledgement message ACQi associated with the selected portable object (or receive an erroneous message), they repeat step 45 unless a chosen number (here two) of messages CHi have already been generated (step 48A). In this latter eventuality, the station-processing means re-execute steps 40 and 42, and the object-processing means of the portable object, previously selected following reception of the selection message CHi in step 46, will not change to their transactional communication condition by virtue of the reception of a new inquiry message INQ in step 49.

An example of selection of one card from four cards C1, C2, C3, C4 is illustrated in FIG. 5.

After the station ST emitted the inquiry message INQ, the cards C1 and C3 transmitted their respective identification messages ID1, ID3 within the same time interval IT1 whereas the cards C2 and C4 transmitted their respective identification messages ID2, ID4 within the second time interval IT2.

The station-processing means were not therefore able to identify in any time interval an identification message associated with a single portable object. Following the silence zone TINQ, the inquiry message INQ is generated again.

This time, whereas the cards C3 and C4 chose the first time interval IT1 to emit their respective identification messages, the card C1 chose the interval IT2 whereas the card C2 chose the interval IT3.

The station-processing means, after having scrutinized the interval IT1 to conclude the non-identification of an identification message, analyze the content of the interval IT2 and identify the latter as being the identification message ID1 associated with the card C1.

The selection message CH1 is then emitted in the zone of action, intended for all the portable objects and particularly intended for the card C1.

It will be possible therefore for the transaction to then be set up between this card C1 and the station, whereas the other cards remain on standby until receiving a new inquiry message INQ at the end of this transaction.

Figure 6:
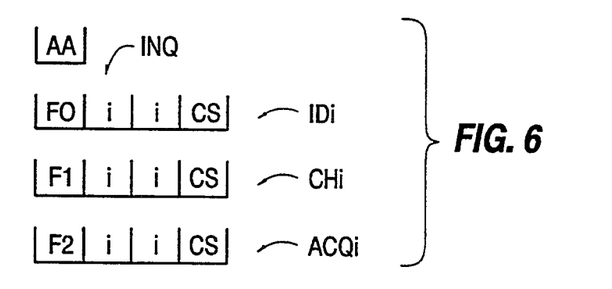

FIG. 6 illustrates the structure of the messages exchanged under the primary CPR and initialization CIN conditions. Whereas the inquiry message INQ comprises only a single character whose word bears the reference AA, each of the identification IDi, selection CHi and acknowledgement ACQi messages comprises a start character specific to the message (more precisely, the respective words F0, F1, F2 of these start characters differ for each type of message). This start character is followed by a specified number of identification characters which is associated one-to-one with the portable object. Here, this number is two and the word of each of these identification characters is referenced i. These three characters are finally followed by a final character whose word CS contains an item of information for validating the contents of the words of the preceding characters. This item of information will preferably be equal to the value of an EXCLUSIVE OR logic function of the contents of the words of the preceding characters ("checksum").

Such an item of information contained in the final character will thus permit the element receiving a message (the station or a portable object) to verify the accuracy of its content, recalculating the word of the final character from the words of the preceding characters, and comparing it with the word CS of the final character actually received.

Figure 7:
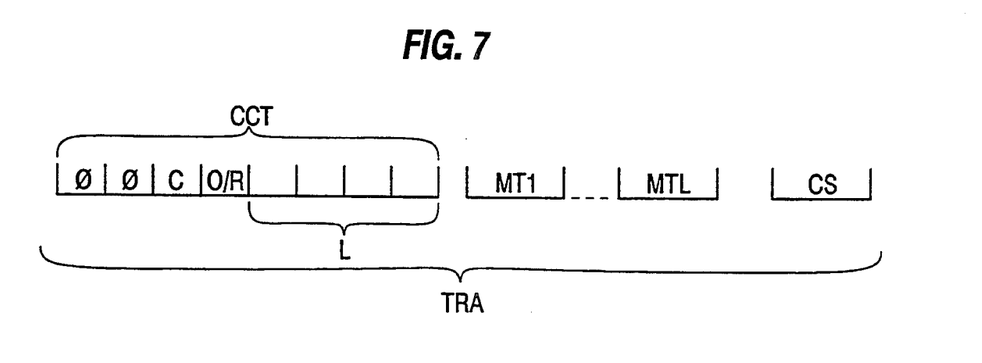

Under the dialog and transactional communication conditions, the exchange of information occurs via transactional messages TRA whose structure is illustrated in FIG. 7.

Each transactional message comprises a control character whose word CCT possesses a bit c representing the first transmission of the transactional message or its possible repetition, a bit o/r indicating the origin of this message, that is to say the transmission of this message by the station or by the portable object, and a specified number of bits, here four, indicating the number of data characters of the transactional message TRA. The first two bits of the word are here equal to zero and are not used in this application.

The transactional message TRA comprises, following the control character, a plurality of data characters whose number L is determined by the word of the control character. The words of these data characters are here designated by the references MT1–MTL.

The transactional message likewise finally comprises a final character CS analogous to the final characters of the messages exchanged under the primary and initialization conditions.

In general, the word MT1 of the first data character MT1 of a transactional message transmitted from the station to the portable object contains a prompt representing a type of operation to be effected by the portable object. The number of data characters and/or their respective contents then depend on the prompt.

In parallel, the transactional response message emitted by the object-dialog unit on reception of such a transactional message TRA comprises a first datum character whose word contains a response prompt representing execution of the operation.

Figure 8:
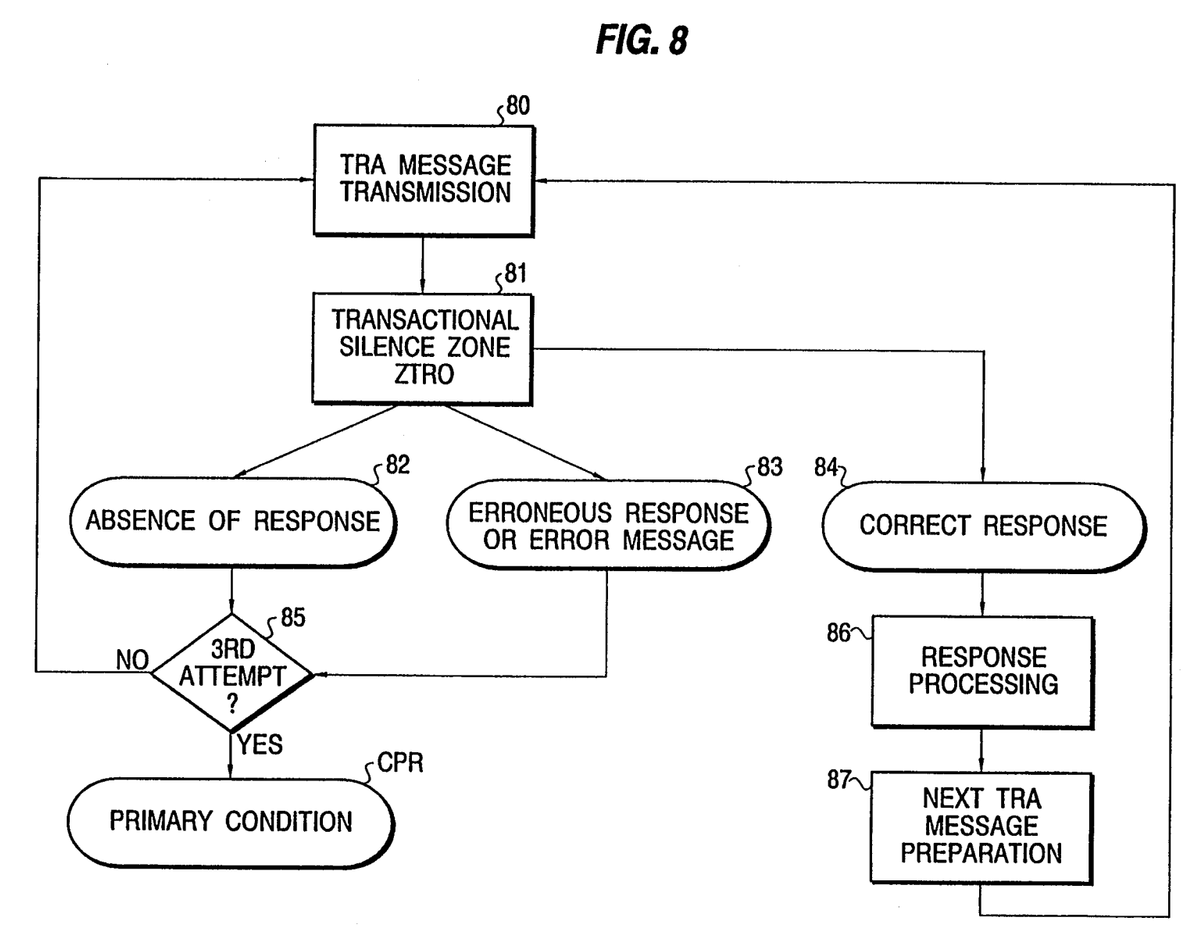

The protocol for transmission of the transactional messages TRA is illustrated in FIG. 8.

Each message TRA transmitted by the station-dialog unit (step 80) is followed by a transactional silence zone ZTRO during which the station-processing means are able to analyze the response transmitted by the object-dialog unit.

Three cases may occur and bear the references 82, 83 and 84 respectively.

In the event of absence of response or in the event of reception of an erroneous response (or of an error message) on the part of the object-dialog unit (82, 83), the station-processing means are able to repeat the transmission of the message TRA at the end of the transactional silence zone ZTRO.

However, after a specified number of repetitions (step 85), the station-command means are able to change the station-processing means from their dialog condition CDI to their primary condition CPR. This number is here chosen equal to 3.

A response may be erroneous if for example there is an error in the word CS of the final character or else if for example the content of the word of the first datum character transmitted by the card to the terminal does not correspond to the execution of the command ordered in the transmission of the original message TRA.

The duration of this transactional silence zone ZTRO is variable and depends on the operational content of the message transmitted. More precisely, so as not to penalize the exchange of information, the station-processing means adjust this duration as a function of the nature of the operation requested and of the response time of the portable object which these station-processing means estimate. In fact, a simple calculation operation requires a longer time than a simple read operation. Thus, by way of example, the duration of this silence zone ZTRO may vary between 10 milliseconds and 300 milliseconds.

In the case (reference 84) in which the station-processing means analyze the content of the transactional response message as being correct, this response message is processed (86), then the next transactional message is prepared (step 87) so as to be transmitted to the object-dialog unit (step 80).

Figure 9:
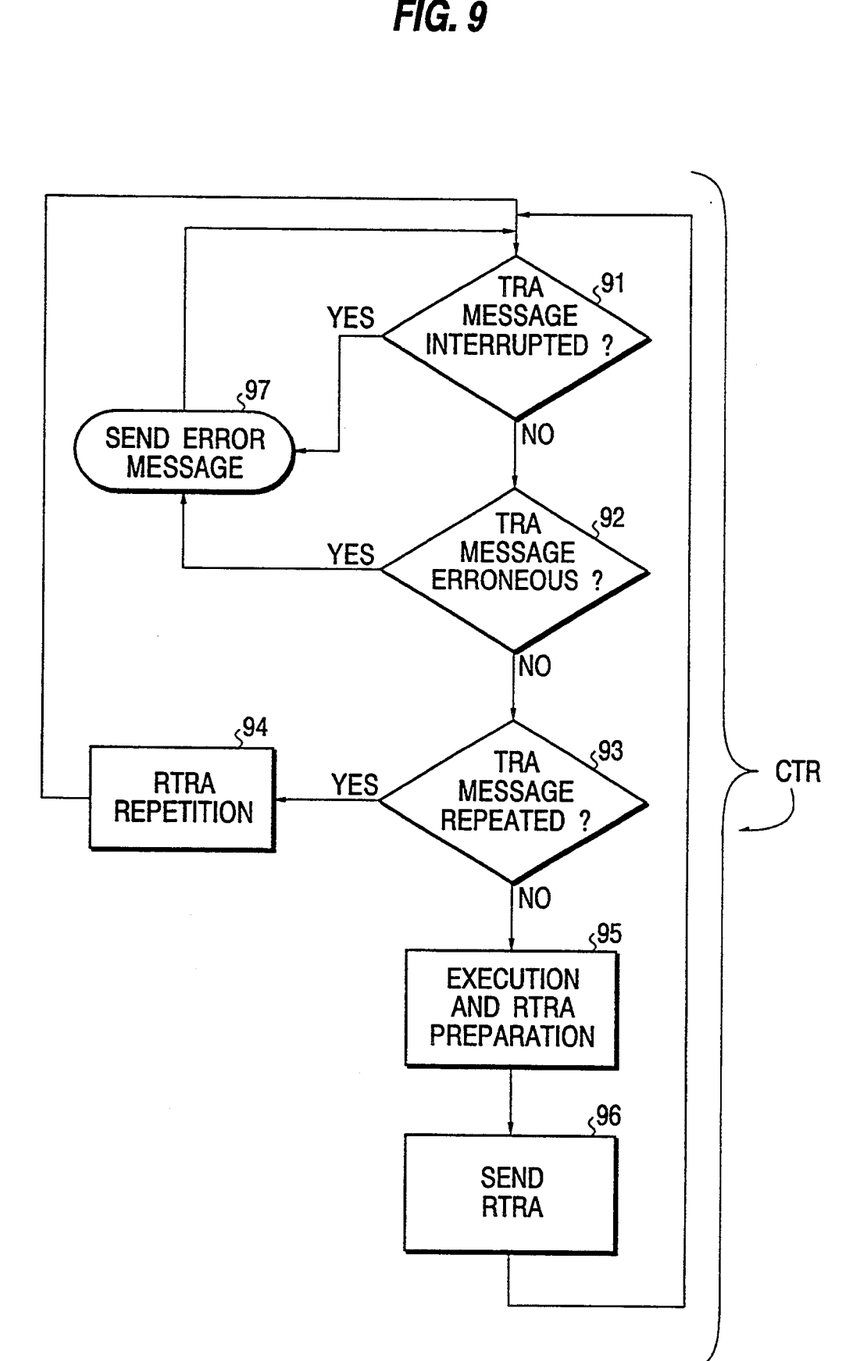

Reference is now made more particularly to FIG. 9 which illustrates the protocol for the object-processing means in their transactional communication condition CTR.

Assuming that the transactional message TRA emitted by the station-dialog unit and received by the object-dialog unit is neither interrupted nor erroneous nor repeated, the object-processing means execute the operation requested by the station and prepare the corresponding transactional response message RTRA (step 95) then transmit it in step 96.

If the message TRA turns out to be interrupted (step 91) or else if this message TRA turns out to be erroneous (step 92) (for example whose word CS of the final character is erroneous), the object-processing means then transmit an error message (step 97) intended for the station.

The concept of interrupted message here embraces the actual interruption of a message (due for example to an absence of magnetic field) and the observation that a duration greater than a chosen value separates the reception of two successive bytes. This value (here 8 milliseconds) is chosen to be markedly greater than the normal duration of transmission of a byte (about 1 millisecond).

In the case in which, for example following a break in transmission between the card and the terminal, it turns out that the message received had already previously been so (step 93), the object-processing means do not re-execute the order and return (step 94) the response message which they had previously set up and transmitted to the station-dialog unit. As noted above, the prompt of the repetition of a message is furnished by the bit c of the control byte.

Figure 10:
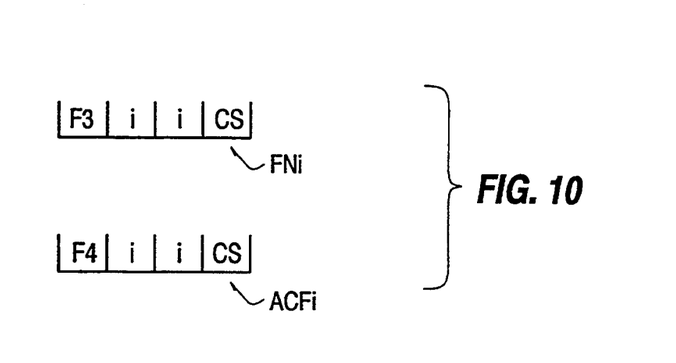

Under the dialog and transactional communication conditions, the station-dialog unit is able to transmit, at the end of a transaction, an end-of-transaction message FNi whereas the object-dialog unit is able, in response to this end-of-transaction message, to transmit a final acknowledgement message ACFi. The respective structures of these two messages are illustrated in FIG. 10 and are analogous to those of the identification, selection and acknowledgement messages of FIG. 6.

Another characteristic of the invention is that each word of a character having a number of bits equal to zero greater than a specified threshold is twos complemented before its transmission, and this at least when the said character is intended to be transmitted from the portable object to the station. In the present case, a byte whose number of zero bits will be greater than four is complemented before its transmission from the card to the terminal.

It has in fact been observed that a byte comprising more zeros than ones could reduce the quality of the asynchronous transmission at least in the card-terminal direction by virtue of the features of the transmission used here (variation in the working frequency of an oscillator). Such a complementation operation remedies this disadvantage.

It then turned out to be particularly attractive to use the parity bit bp of the character, that is to say the ninth programmable bit of the serial link of the microcontroller, to indicate whether the byte is complemented or not. Thus, by convention, the setting of this bit to 1 signifies that the byte is complemented. An advantage of this complementation operation lies in the fact that it is not then necessary to use a supplementary byte on transmission. It is in fact recalled that the transmission of a byte at 9600 baud lasts about 1 millisecond and turns out to be not insignificant compared to the duration of a transaction, the minimum of which is 10 milliseconds (or 10+32=42 milliseconds if the initialization condition is to be included in what is referred to as the transaction), going up to 400 milliseconds.

Before describing the other features of the exchange of information between the station and the portable object, it is expedient to return to the detection of the limits of the range of action defined by the station, or in other words to the detection of the limits of the magnetic field generated by the station-inductive element.

In the particular case described here it has been seen that when the interrupt lug of the microcontroller is in its low state, this represents the presence of the card in the magnetic field, whereas when this interrupt lug is in the high state, this represents the presence of the card outside the range of action.

This being so, the various states of this interrupt lug are stored in the input buffer-memory of the microcontroller. The object-command means are then able to sequentially analyze the content of this memory at analysis instants from a plurality of specified analysis periods.

Figure 11:
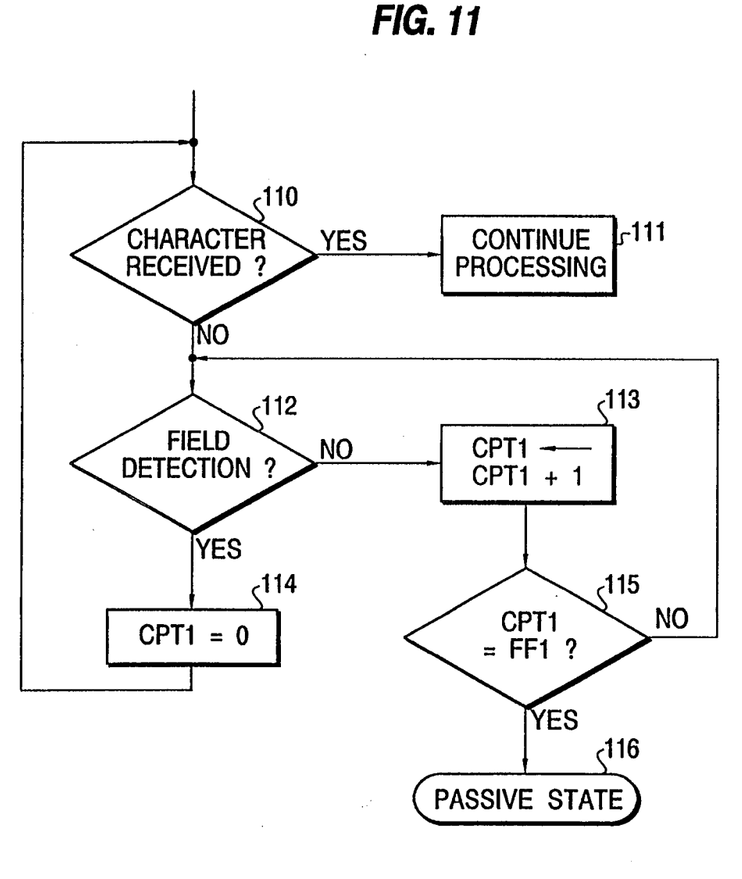
FIGS. 11 to 13 illustrate overviews relating to particular points of operation of the device according to the invention.

One of these analysis periods is the awaiting of a character coming from the station-dialog unit and is illustrated in FIG. 11.

If the character is actually received (step 110), processing continues normally (step 111). By contrast, in the case of absence of reception of a character, the object-command means will sequentially analyze the content of the buffer-memory of the microcontroller (step 112) and increment a counter CPT1 (step 113) each time the inquiring of the memory furnishes a prompt representing the presence of the object-dialog unit outside the range of action (lug in the high state).

After a specified number of successive analysis instants from this analysis period having led to a value of the counter CPT1 equal to a specified number FF1, here corresponding to a duration of 28 milliseconds, the object-command means are then able to change the object-processing means from their active state to their passive state, since this situation then signifies that the card has left the range of action. There is therefore no point in continuing to supply all the consecutive elements of this card.

By contrast, once the buffer-memory includes a prompt signifying that the interrupt lug is in the low state, that is to say for example when a 1 bit (such as the first bit bs of a character) has been received, the counter CPT1 is reset to zero (step 114) until the next analysis.

A second analysis period begins (FIG. 12) from an initial analysis instant intervening after the transmission 120 of the final acknowledgement message ACFi. A second counter CPT2 is then set to a reference value FF2 (step 121). From here onwards, the object-command means sequentially analyze the content of the buffer-memory and decrement the counter CPT2 (step 123) each time the interrupt lug of the microcontroller appears in the high state. When the counter CPT2 (step 124) has reached the value 0, here corresponding to a time delay of 0.7 seconds, the object-command means switch the object-processing means from their active state to their passive state (step 115).

Figure 12:
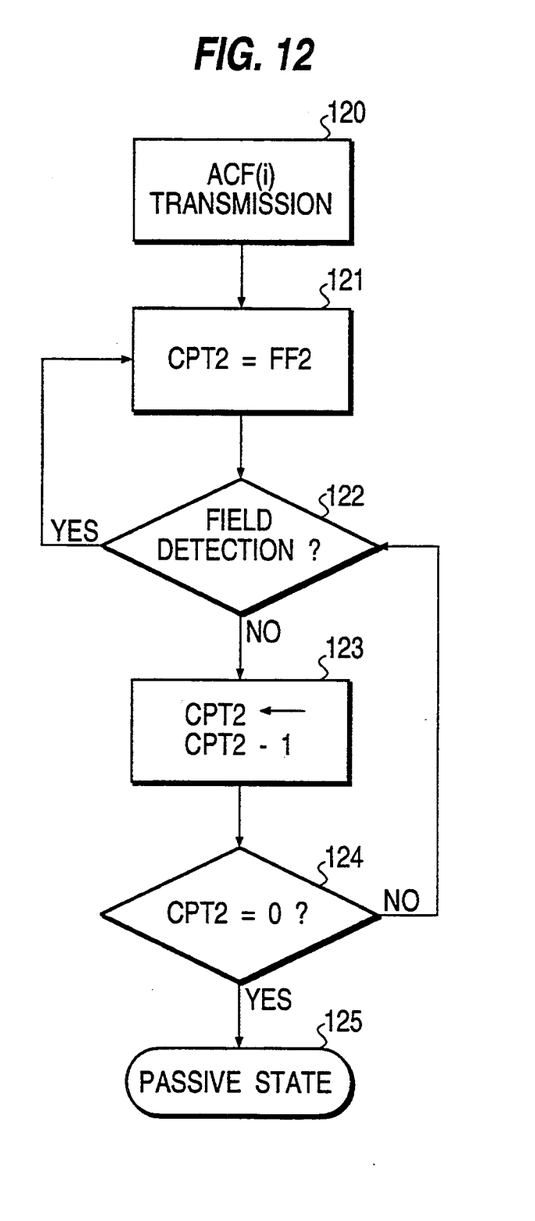

The changing of the object-processing means from their active state to their passive state thus occurs when analysis of the state of the interrupt lug of the microcontroller has revealed the presence of the object-dialog unit outside the range of action during a specified number of successive analysis instants counting from a reference instant which is here the initial analysis instant.

However, if during this analysis it turns out that, at a current instant, the interrupt lug is in the low state, signifying that the card lies inside the magnetic field again, the counter CPT2 is reinitialized and the analysis continues from this current instant taken as new reference analysis instant.

In other words, it has been observed that a delay of 0.7 seconds was required here to allow time for the carrier of the card to leave the range of action without setting off a new transaction between the card and a portable object. Within this delay, the presence of the portable object inside the range of action is continuously tested in order to verify the motion of the carrier of this card. This thus makes it possible to account for practically all human behaviours such as those which can be encountered with a slow, hurried or negligent user.

Just as the portable object's leaving of the range of action must be processed cautiously since it depends on the conduct of the carrier, as has just been seen, certain precautions should be taken when a portable object enters the range of action.

Figure 13:
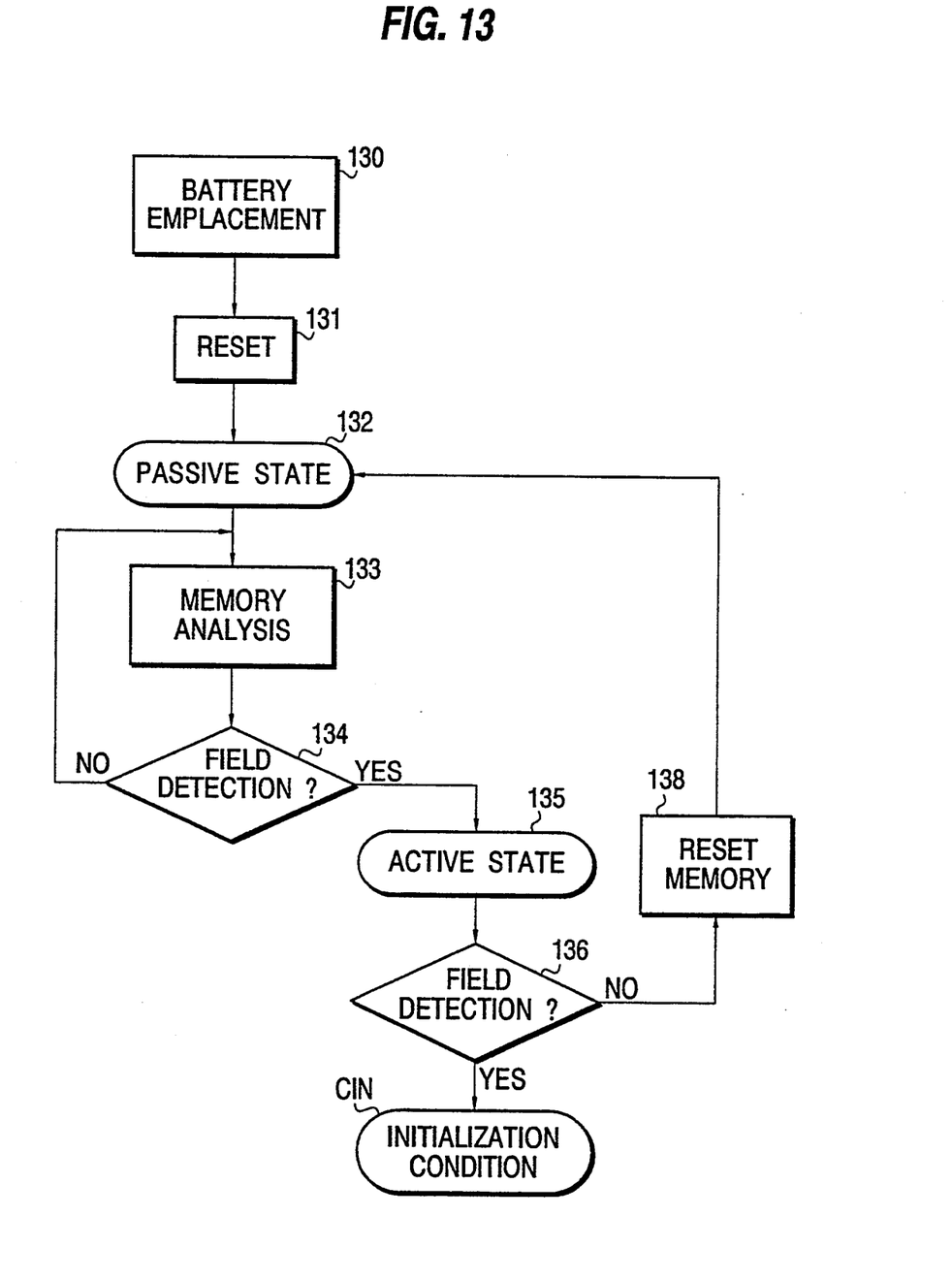

This is illustrated in FIG. 13.

As already mentioned earlier, on emplacement of the battery (step 130), the microcontroller of the card is supplied, then reset to zero (step 131), and the object-processing means are then in their passive state 132.

The memory analysis performed in step 133 then reveals an interrupt lug in the high state. When the card enters the range of action of the station, a hardware interrupt, conveyed by the interrupt lug of the microcontroller (low state), and engendered by the resonance of the oscillating circuit, is stored in the buffer-memory.

The object-command means then switch the object-processing means from their passive state to their active state (step 135).

However, it has been observed that the limits of the range of action are not generally sharp limits. In other words, there are irregularities in the magnetic field in the vicinity of these limits of the range of action.

For this reason, once the object-dialog unit is in its active state, the object-command means only change the object-processing means to their initialization condition in the case when analysis of the buffer-memory does not reveal, during a specified number of successive instants corresponding to a duration of 0.2 milliseconds, any prompt of the presence of the dialog unit outside the range of action. In the contrary case, that is to say when during this analysis period it turns out that the interrupt lug returns to the high state, signifying that, by virtue in particular of the irregularities in the magnetic field, the card has not yet completely entered the stable zone, the object-command means change the object-dialog unit from its active state to its passive state.

However, bearing in mind the fact that the buffer-memory of the microcontroller storing the states of the interrupt lug is a latch-memory, the irregularities in the magnetic field were able to create an automatic placing on standby of the low states of the interrupt lug which are masked while the portable object exchanges information in the initialization and transactional communication conditions, and which will be active on the return to the passive state of the object-dialog unit when the carrier leaves the range of action. A new irrelevant transaction between the carrier and the station will then result therefrom, despite the delay of 700 milliseconds used here.

Furthermore, in order to avoid such a disadvantage, the object-command means erase (step 138) the content of the latch-memory.

The device according to the invention finds applications in numerous areas such as access to a building, automatic payment in a company restaurant, or access to a car park. All these applications may possibly be realized through the same card and are then distinguished from one another by an application indicator contained in the permanent memory M2 of the card.

It is also expedient to remark that a card may possibly be used without the knowledge of its owner since no deliberate action is necessary a priori on the part of the user of the card in order for the latter to change from its passive state to its active state. For this reason provision has been made that certain at least of the portable objects comprise specific validation means MV able to be commanded by the user in order to authorize or otherwise permit the exchange of information with the station. These means may for example include a validation push-button on the card, which must be operated before the latter is used, for the applications requiring this facility.

The object-processing means then authorize the setting off of such an application only if the validation button has been activated beforehand. There is then provision for the card to subsequently become invalidated again. Nevertheless, for reasons of security, there may also be provision for a delay mechanism to invalidate the card anyway after a certain time, for example one minute, even if no application has been activated.

The invention is not limited to the embodiment described above but encompasses all the variants thereof contained within the scope of the claims hereinbelow.

Of course, certain of the means described above may be omitted in the variants in which they serve no purpose.

What is claimed is:

1. A device for remote exchange of information between a station and at least one portable object, comprising:
   a station-dialog unit including
      means for defining a range of action;
      station-processing means for processing the information exchanged with the at least one portable object, by repeatedly generating, in a primary condition, an enquiry message in the range of action, followed by a silence zone, then selectively analyzing respective contents of a plurality of disjoint time intervals in the silence zone, until identification in one of the disjoint time intervals a specified response message associated with a single portable object, generating a selection message intended for the single portable object and entering a dialog condition for communication with the single portable object;
      station-command means for selecting between the primary and dialog conditions of said station-processing means as a function of previously specified station-command criteria; and
   an object-dialog unit in each portable unit, having an active state to mutually interact remotely with said station-dialog unit inside the range of action, including
      communication means for performing the exchange of information with said station-dialog unit;
      object-processing means for responding to reception of the enquiry message in an initialization condition in the active state, by randomly choosing one of the time intervals to generate the specified response message associated therewith and to generate an acknowledgement message upon reception of the selection message and then entering a transactional communication condition for communication with said station-dialog unit; and object-command means for changing said object-processing means from the initialization condition to the transactional communication condition if another enquiry message is not received after transmission of the acknowledgement message.

2. A device according to claim 1, wherein said communication means performs the exchange of information asynchronously by characters each including a header bit, followed by a word having a specified number of data bits, followed by a parity bit and an end bit.

3. A device according to claim 1,
wherein in the dialog condition, said station-dialog unit transmits an end-of-transaction message, and
wherein said object-dialog unit, in response to the end-of transaction message, transmits a final acknowledgement message.

4. A device according to claim 3, wherein said communication means transmits each of the specified response, acknowledgement, selection, end-of-transaction and final acknowledgement messages with a start character specific thereto and a specified number of identification characters associated one-to-one with a specific portable object.

5. A device according to claim 1, wherein in the dialog and transactional communication conditions, the exchange of information by said communication means includes exchanging transactional messages each including a control character followed by data characters, the control character including a bit representing one of a first transmission of one of the transactional messages and repetition of the one of the transactional messages, one bit indicating an origin of the one of the transactional messages and a specified number of bits indicating a number of data characters of the one of the transactional messages.

6. A device according to claim 5,
wherein a first data character of the transactional message transmitted from the station to the portable object comprises a prompt representing a type of operation to be effected by the portable object,
wherein at least one of the number of data characters and the content of the transactional message depend on the prompt, and
wherein said object-dialog unit in response to one of the transactional messages, to the station a transactional response message having a first data character including a response prompt representing execution of the operation.

7. A device according to claim 6
wherein, in the dialog condition, each message transmitted by said station-dialog unit is followed by a transactional silence zone during which said station-processing means analyzes the transaction response message transmitted by said station-dialog unit,
wherein in response to one of absence of a response and reception of an erroneous response from said object-dialog unit to the transactional message transmitted by said station-dialog unit, said station dialog unit repeats transmission of the transactional message after the transactional silence zone, and wherein after a specified number of repetitions without receiving a proper response, said station-command means changes said station-processing means from the dialog condition to the primary condition.

8. A device according to claim 7, wherein said station-dialog unit produces the transactional silence zone with a variable duration dependent on the transactional message.

9. A device according to claim 6, wherein said communication means transmits each of the transactional, transactional response, specified response, acknowledgement and selection messages with a final character containing an item of information for validating preceding characters.

10. A device according to claim 2,
wherein said communication means obtains a twos complement of the word of each character having a number of bits equal to zero greater than a specified threshold before transmission, at least for transmission from the at least one portable object to the station, the parity bit indicating whether there is twos complementation.

11. A device according to claim 5 wherein in the transactional communication condition, said object-processing means transmits an error message to said station-dialog unit upon receiving an erroneous transactional message and when a duration greater than a chosen value separates two characters of the transactional message.

12. A device according to claim 3,
wherein said object-dialog unit comprises:
detection means for outputting a prompt relating to existence of said object-dialog unit in the range of action of the station; and
a memory connected to said detection means for storing the prompt, and
wherein said object-command means sequentially analyzes the contents of said memory at analysis instants for a plurality of specified analysis periods.

13. A device according to claim 12,
wherein said object-dialog unit further has a passive state, and
wherein said object-command means includes a first analysis period for awaiting a character from said station-dialog unit, and when said object-dialog unit is determined to be outside the range of action during a first specified number of successive analysis instants during the first analysis period, said object-command means changes said object-processing means from the active state to the passive state.

14. A device according to claim 13 wherein during a second analysis period from an initial analysis instant intervening after transmission of the final acknowledgement message and until analysis reveals existence of said object-dialog unit outside the range of action during a second specified number of successive analysis instants counting from a reference analysis instant, said object-command means changes said object-processing means from the active state to the passive state, where the reference analysis instant is firstly an initial analysis instant, and, if reached, a last current analysis instant for which the prompt represents the presence of said object-dialog unit in the range of action.

15. A device according to claim 14,
wherein said memory is a latch-memory,
wherein a third analysis period is provided when said object-dialog unit is in the passive state, wherein said object-command means switches said object-dialog unit from the passive state to the active state in response to a prompt signifying that said object-dialog unit lies inside the range of action, and starts a fourth analysis period after switching states, and wherein said object-command means only changes said object-processing means into the initialization condition when analysis reveals, at a fourth specified number of successive instants during the fourth analysis period, no prompt of existence of said object-dialog unit outside the range of action and otherwise said object-command means changes said object-dialog unit from the active state into the passive state with erasure of said latch-memory.

16. A device according to claim 1, wherein at least one of the portable objects comprises specific validation means for indicating to the station when a user authorizes the exchange of information with the station.

17. An object-dialog unit in a portable object for interacting with a station, comprising:
  means for defining one of a plurality of states including a passive state and an active state to remotely interact with the station inside a range of action defined by the station, said object-dialog unit exchanging information with the station;
  object-processing means for responding, in an initialization condition in the active state, to reception of an enquiry message transmitted by the station and followed by a silence zone, by generating a specified response message intended for the station within a time interval chosen from a plurality of disjoint time intervals in the silence zone, and by generating an acknowledgement message, subsequent to transmission of the response message, upon receipt of a selection message transmitted by the station, and entering a transactional communication condition for communication with the station; and
  object-command means for changing said object-processing means from the initialization condition to the transactional communication condition if another enquiry message is not received after transmission of the acknowledgement message.

18. A portable object according to claim 17, wherein while said object-processing means is in the transactional communication condition, the station transmits an end-of-transaction message, and
  wherein said object-dialog unit, in response to the end-of transaction message, transmits a final acknowledgement message.

19. A station in a device for remote exchange of information between the station and at least one portable object, comprising:
  a station-dialog unit including
    means for defining a range of action;
    station-processing means for processing the information exchanged with the at least one portable object, by repeatedly generating, in a primary condition an enquiry message in the range of action, followed by a silence zone, then selectively analyzing respective contents of a plurality of disjoint time intervals in the silence zone, until identifying in one of the disjoint time intervals a specified response message associated with a single portable object, generating a selection message intended for the single portable object and entering a dialog condition for communication with the single portable object; and
    station-command means for selecting between the primary and dialog conditions of said station-processing means as a function of previously specified station-command criteria.

20. A device according to claim 9, wherein the final character is equal to and EXCLUSIVE OR logic function of the preceding characters.

21. A portable object according to claim 17, wherein said object-dialog unit exchanges information with the station asynchronously by characters, each including a header bit, followed by a word having a specified number of data bits, followed by a parity bit and an end bit.

22. A portable object according to claim 18, wherein said communication means transmits each of the specified response, acknowledgement, selection, end-of-transaction and final acknowledgement messages with a final character containing an item of information for validating preceding characters.

23. A portable object according to claim 17, wherein said object-processing means exchanges transactional messages with the station in the transactional communication condition, each transactional message including a control character followed by a number of data characters, the control character indicating an origin of the transactional message, the number of data characters in the transactional message and one of a first transmission of a transactional message and repetition of the transactional message.

24. A portable object according to claim 23, wherein a first data character of the transactional message transmitted from the station to said portable object includes a prompt representing a type of operation to be effected by said portable object and at least one of the number of data characters and the content of the transactional message depend on the prompt, and
  wherein said object-dialog unit, in response to one of the transactional messages, transmits to the station a transactional response message having a first data character including a response prompt representing execution of the operation.

25. A portable object according to claim 17, wherein said object-dialog unit comprises a communication unit to obtain a twos complement to transmit a word of a character having a number of zero bits greater than a specified threshold and to set a parity bit to indicate use of twos complement.

26. A portable object according to claim 17, wherein said object-processing means transmits an error message to the station in the transactional communication condition, upon receiving an erroneous transactional message and when a duration greater than a chosen value separates two characters of a transactional message.

27. A portable object according to claim 17,
  wherein said object-dialog unit further comprises:
    detection means for outputting a prompt relating to existence of said object-dialog unit in the range of action of the station; and
    a memory connected to said detection means for storing the prompt, and
  wherein said object-command means sequentially analyzes the contents of said memory at analysis instants for a plurality of specified analysis periods.

28. A portable object according to claim 27,
  wherein said object-dialog unit further has a passive state, and wherein said object-command means awaits a character from the station unit during a first analysis period, and when said object-dialog unit is determined to be outside the range of action during a first specified number of successive analysis instants during the first analysis period, said object-command means instructs said object-processing means to change said object-dialog unit from the active state to the passive state.

29. A portable object according to claim 28, wherein during a second analysis period from an initial analysis instant intervening after transmission of the final acknowledgement message and until analysis reveals existence of said object-dialog unit outside the range of action during a second specified number of successive analysis instants counting from a reference analysis instant, said object-command means instructs said object-processing means to change said object-dialog unit from the active state to the passive state, where the reference analysis instant is firstly an initial analysis instant, and, if reached, a last current analysis instant for which the prompt represents the presence of said object-dialog unit in the range of action.

30. A portable object according to claim 29,
wherein said memory is a latch-memory,
wherein a third analysis period is provided when said object-dialog unit is in the passive state,
wherein said object-command means instructs said object-dialog unit to switch said object-dialog unit from the passive state to the active state in response to a prompt signifying that said object-dialog unit lies inside the range of action, and starts a fourth analysis period after switching states, and
wherein said object-command means only instructs said object-processing means to change said object-dialog unit to the initialization condition when analysis reveals, at a fourth specified number of successive instants during the fourth analysis period, no prompt of existence of said object-dialog unit outside the range of action and otherwise said object-command means changes said object-dialog unit from the active state into the passive state with erasure of said latch-memory.

31. A method for remote exchange of information between a station and at least one portable object, comprising the steps of:
(a) defining a range of action and specifying station command criteria;
(b) repeatedly broadcasting from the station into the range of action, when the station is in a primary condition, an enquiry message followed by a silence zone having a plurality of disjoint time intervals;
(c) responding to reception of the enquiry message, in each portable object in an initialization condition of an active state in the range of action, by randomly choosing one of the disjoint time intervals to generate a specified response message associated therewith;
(d) selectively analyzing, in the station, respective contents of the disjoint time intervals in the silence zone;
(e) identifying by the station, in the one of the disjoint time intervals, the specified response message associated with a single portable object;
(f) selecting in the station between the primary condition and a dialog condition for communication with the single portable object, as a function of the station command criteria;
(g) generating, upon selecting the dialog condition in the station, a selection message intended for the single portable object;
(h) generating an acknowledgement message in the single portable object upon reception of the selection message;
(i) changing, in the single portable object, from the initialization condition to a transactional communication condition if another enquiry message is not received after transmission of the acknowledgement message; and
(j) exchanging transactional messages between the station in the dialog condition and the single portable object in the transactional communication condition.

32. A method as recited in claim 31, wherein each transactional message exchanged in step (j) includes a control character followed by a number of data characters, the control character indicating an origin of the transactional message, the number of data characters in the transactional message and one of a first transmission of a transactional message and repetition of the transactional message.

33. A method for remote exchange of information between a station and at least one portable object, comprising the steps of:
(a) repeatedly broadcasting from the station an enquiry message followed by a silence zone having a plurality of disjoint time intervals;
(b) responding, in each portable object receiving the enquiry message, by randomly choosing one of the disjoint time intervals to generate a specified response message associated therewith;
(c) identifying by the station, in one of the disjoint time intervals, the specified response message associated with a single portable object;
(d) generating in the station a selection message intended for the single portable object;
(e) generating an acknowledgement message in the single portable object upon reception of the selection message; and
(f) exchanging information between the station and the single portable object upon receipt of the acknowledgement message by the station.

* * * * *